United States Patent

[11] 3,537,430

| [72] | Inventor | William S. Peppler<br>Chappaqua, New York |
|---|---|---|
| [21] | Appl. No. | 777,603 |
| [22] | Filed | Nov. 21, 1968 |
| [45] | Patented | Nov. 3, 1970 |
| [73] | Assignee | Diamond International Corporation<br>New York, New York<br>a corporation of Delaware |

[54] AUTOMATIC WATER SUPPLY SYSTEM FOR POULTRY, WATER DISPENSING VALVE AND METHOD FOR TRAINING POULTRY TO USE SAME
10 Claims, 7 Drawing Figs.

| [52] | U.S. Cl. | 119/72.5 |
| [51] | Int. Cl. | A01k 07/00 |
| [50] | Field of Search | 119/72.5, 75; 251/339, 368, 366 |

[56] References Cited
UNITED STATES PATENTS

| 1,918,566 | 7/1933 | Sadleir | 119/72.5 |
| 2,851,007 | 9/1958 | Kagan | 119/72.5 |
| 3,476,088 | 11/1969 | Smith | 119/72.5 |
| 3,483,847 | 12/1969 | Kneubuehl | 119/75 |

*Primary Examiner*—Hugh R. Chamblee
*Attorney*—Karl W. Flocks

ABSTRACT: An automatic, demand-type poultry-operated watering system in which a plurality of valves are mechanically, manually, etc. operated periodically whereby poultry are attracted by movement of a valve operator and the presence of a water supply thereat, causing the poultry to peck at the operator of the valves due to such movement and normal instinct to quench thirst, resulting in the poultry being trained to actuate the valves of a continuously available watering system while maintaining sanitary conditions in the poultry house in which the system is installed and in which the training takes place.

Patented Nov. 3, 1970

INVENTOR
WILLIAM S. PEPPLER

BY
ATTORNEY

Patented Nov. 3, 1970

INVENTOR
WILLIAM S. PEPPLER

BY Karl W. Flocks
ATTORNEY

AUTOMATIC WATER SUPPLY SYSTEM FOR POULTRY, WATER DISPENSING VALVE AND METHOD FOR TRAINING POULTRY TO USE SAME

One important factor in the raising of poultry is to provide an adequate supply of drinking water in order to raise healthy poultry, obtain maximum egg production, etc. Water also serves as a medium in which medicants, vitamins, etc. can be deposited and administered to the poultry to maintain them in a healthy condition, and prepare them for market according to relatively tight or fixed schedules. Further, excessive stagnant water in a poultry house tends to promote unsanitary and unhealthy conditions. It has been found that poultry inherently will peck at a moving object, for example, this is the normal instinctive feeding procedure when attempting to find natural food, such as insects, worms, etc. Further, certain colors apparently will attract poultry more than others; red, for example; the color red will apparently more readily attract poultry than black, for example.

Automatic watering systems operated by the poultry, and conveniently described as demand-systems, are known in the prior art, as exemplified, by way of example only, by the following patents: Wysong U.S. Pat. No. 1,811,375; Karst U.S. Pat. No. 1,903,767; Kubler U.S. Pat. No. 1,912,530; Sadleir U.S. Pat. No. 1,918,566; Bartlett U.S. Pat. No. 2,934,968; Hewitt U.S. Pat. No. 2,307,220; Beckley U.S. Pat. No. 2,486,729; Pine U.S. Pat. No. 2,510,252; Futterer U.S. Pat. No. 2,614,531; Kagan U.S. Pat. No. 2,690,160; Thompson U.S. Pat. No. 2,710,594; Kagan U.S. Pat No. 2,851,007; Curry U.S. Pat. No. 3,008,451; Alter U.S. Pat. No. 3,128,745 and Nakajima et al. U.S. Pat. No. 3,263,652.

It has been further found that poultry do not instinctively know how to operate automatic watering systems incorporating poultry-actuated water dispensing valves, and the poultry have to be trained to use systems incorporating such valves. Initially, if the valves are manually adjusted to constantly drip to relieve the poultry's thirst, unsanitary conditions can be created, each valve in the poultry house (there are generally hundreds involved) must be adjusted individually, and since most of the conventional systems include valves which are normally elevated, this is not the natural attitude from which poultry drink. If the watering valves are leakproof, i.e., do not have a built-in constant drip action, and the poultry do not instinctively know how to operate these valves, and in view of the other factors mentioned, the relatively young poultry may become weak, susceptible to disease at an early age, contaminating an entire flock, and, accordingly, these conditions do not produce healthy poultry for market, healthy layers, etc.

Primary objects of the present invention are to provide a watering system which automatically trains poultry to use the poultry-actuated watering valves; to provide a novel method for training poultry to use the watering valves with a minimum of supervision of the system; to provide a system minimizing damp and unsanitary conditions in a poultry house; to provide a novel watering system in which poultry-actuated valves are periodically operated by means other than the poultry, wherein such periodic operation causes movement of a poultry-actuated operating element causing the poultry to peck the same; to provide a supply of water to the poultry and, which, over a relatively short period of time, automatically trains poultry to use the system; and more specifically to provide an improved poultry-actuated watering valve subject to operation by varying pressure differential in a water supply line; and in which the valves of the system are readily removed for maintenance and repair, are relatively simple in construction and operation.

Objects and advantages of the invention, will become apparent from a consideration of the following description of an exemplary embodiment when taken in conjunction with the drawings forming a part thereof:

Figure 1:
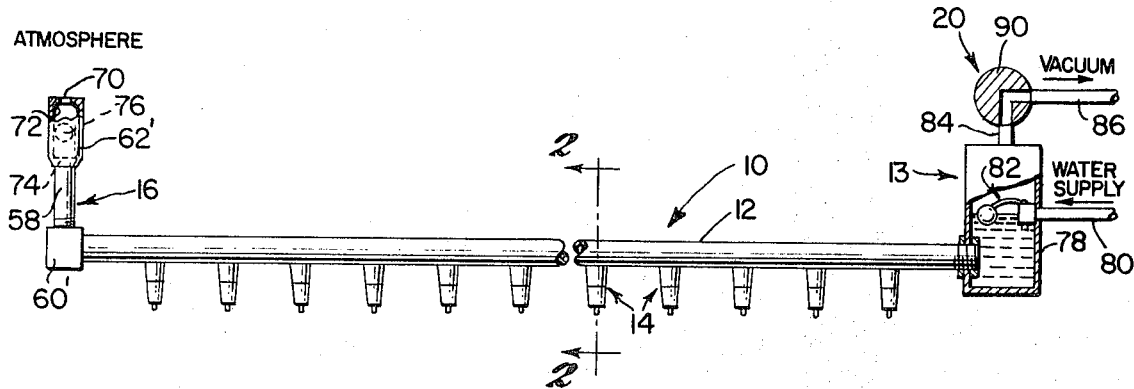
FIG. 1 is a vertical elevational view, substantially diagrammatic, showing the basic components of a system illustrating the invention with an intermediate portion of a water supply line broken away.

Referring to the drawings in detail, and first considering FIG. 1, a watering system is indicated generally at 10 and comprises elongated feed line or conduit 12 (produced of any suitable material) and having depending therefrom, in longitudinally spaced relation, a plurality of poultry-actuated watering valve means 14. Connected in any suitable manner to one end of the line 12 is a vent-and-valve means 16, and connected to the other end of line 12 in any suitable manner is a water supply means 13 communicating with a two-position valve means 20 functioning for periodically communicating a vacuum to the poultry watering line 12.

Figure 3:
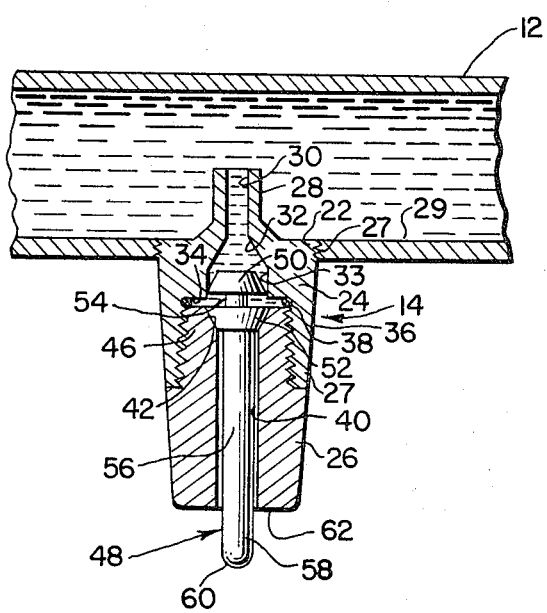
FIG. 3 is a vertical section taken on the plane of line 3–3 of FIG. 2, showing the watering valve in a "closed" condition.
Figure 2:
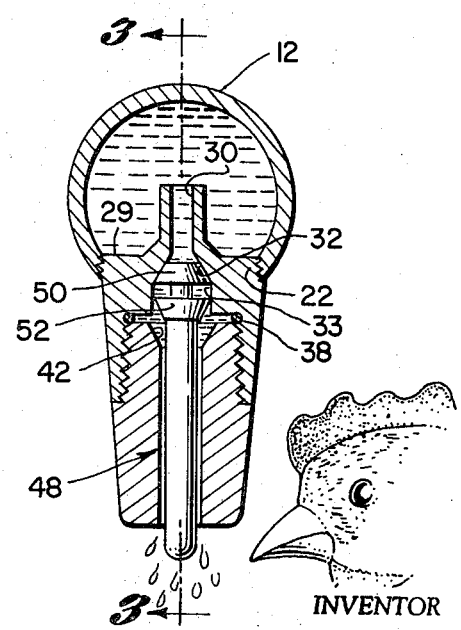
FIG. 2 is an enlarged vertical section taken on the plane of line 2–2 of FIG. 1, showing a watering valve in an "open" condition.

The line 12 is disclosed as being generally circular in transverse cross section as seen in FIGS. 2 and 3, however, other cross sections may be utilized.

The line 12 includes threaded apertures 22 for removably receiving the poultry-operated valve means 14. The valve means 14 or assemblies include a two-piece body portion comprising an upper portion 24 and lower portion 26. Portion 24 is externally threaded at 27 to be received in the threaded apertures 22.

Portion 24 of the valve body includes an upper tubular extension 28 projecting partially into the water line 12 above the lower surface 29 thereof and thus generally preventing the passage of sediment or foreign matter through the valve assemblies 14. The extension 28 includes a longitudinal bore 30 communicating with an intermediate, downwardly opening, conical valve seat 32 terminating in a substantially cylindrical chamber 33. An annular shoulder 34 surrounds the lower edge of chamber 33 and extends to a depending, internally threaded sleeve 36. A suitable seal such as an "O-ring" seal 38, if required, can be inserted into the sleeve 36. The lower portion 26 of the valve body includes an elongated, longitudinal bore 40 terminating in an upwardly-opening conical valve seat 42 communicating with the lower end of chamber 33. Portion 26 of the valve body includes an externally threaded stem 46 threadedly engaging in the internally threaded sleeve 36 and engaging the seal 38, as shown.

Trapped in chamber 33 and extending into and through the bore 40, is a valve element indicated generally at 48. The valve element includes longitudinally spaced, opposed conical valve portions 50 and 52 spaced by integral stem 54. The valve portions 50 and 52 are complementary to and will sealingly engage valve seat 32 and 42, respectively.

Depending from valve portion 52 is an elongated, actuator rod 56, longer than bore 40 of the body portion 26, and having a terminal operator portion 58 which is conveniently relieved or rounded, formed as a terminal dome-shape 60. The lower end of the rod 56, which projects below the lower portion 62 of the valve body portion 26, may be conveniently colored red, for example, since this is a color to which poultry are apparently naturally attracted.

The valve element 48 is shown in a "closed" or normal condition in FIG. 3, where the valve portion 52 is seated on valve seat 42, accordingly trapping a quantity of liquid in chamber 33 thereabove. It will be observed that the valve element 48 is seated by a combination of gravity and water pressure acting on the valve element.

Upward movement of the valve element 48 results in valve portion 52 being unseated, and valve portion 50 engaging seat 32, movement of rod 56 permitting air to replace the water and drops of water will then be accessible to the poultry P.

In FIG. 1, the vent-and-valve means 16 comprises a threaded nipple 58 engaged in an L-coupling 60 communicating with the water line or conduit 12. The nipple 58 communicates with a valve chamber 62 vented by an upper opening 70 surrounded by a downwardly disposed valve seat 72. The chamber 62 includes a lower valve seat 74 and disposed in the chamber 62 is a spherical, floatable ball-valve element 76 which can engage either of the valve seats 72, 74.

Under normal atmospheric conditions, the ball-valve 76 floats in chamber 62, and excessive water surging would cause the ball-valve 76 to engage seat 72 and prevent leakage. Normally, the chamber 62 is subject to atmospheric pressure, so water will gravitate out of the poultry-actuated valves 14 when the valve elements are in the "open" condition shown in FIG. 2.

If line 12 is subjected to a vacuum, the ball-valve 76 will be drawn downwardly, with a reduction of the water level, so that it engages seat 74, preventing air leakage into the system, and permitting the poultry-actuated valves to be mechanically or remotely operated.

The water supply means 13 comprises a suitable tank 78 communicating at its lower end with the water line 12 being sealed thereto by means of suitable clamp nuts, etc. The tank 78 is connected to a water supply line 80; normal tap pressure, for example, being satisfactory. The entrance of water into the tank and the maintenance of the water level therein is obtained by means of a conventional float-valve assembly indicated generally at 82 and mounted on the end of the line 80 disposed within the tank 78. The tank is substantially air-tight, however, it will have a suitable seal-plug (not shown) permitting medicants, vitamins and/or other additives to be inserted into the tank to be mixed with the drinking water for the poultry.

In this exemplary embodiment, the two-position valve means 20 includes a nipple 84 connected to a vacuum line 86, by means of a two-position valve 90. The valve 90 is operated in any suitable manner, i.e., manually, mechanically, electrically, etc., to periodically subject the entire system, i.e., tank 78 and line 12 to a vacuum or negative pressure.

Periodic application of vacuum in the system, i.e., in tank 78 and water line 12, results in seating the ball-valve element 76 on seat 74, causing the valve elements 48 of the valve assemblies 14; see FIG. 2, to move upwardly dispensing a small change of water disposed in chamber 33. Additionally, movement of the valve elements, i.e., the lower portion 58, will attract the attention of the poultry.

Normal instincts of the poultry are utilized to attract the poultry by movement of the valve elements, and poultry are also induced by the normal instinct to quench thirst, causing the poultry, in a relatively short time, through the periodic cycling of vacuum mentioned above, to peck at the ends 60 of the valve elements, causing drops of water to be dispensed by the poultry without mechanical or remote operation.

The poultry will become accustomed to expecting a supply of water to be available at the valve assembly, and after regular intervals of actuating the valve assemblies, and by observing the poultry in the poultry house, it can be determined when the mechanical actuation of the valves can be reduced or eliminated.

The training method of fragmentary present invention not only minimizes dampness in the poultry house, but eliminates necessity for individual adjustment of the valves by automatically providing a water supply during the initial training period of the poultry and requires the minimum of maintenance and care. Further, the poultry can be readily supplied with water at the early critical stages of their development and growth.

Figure 4:
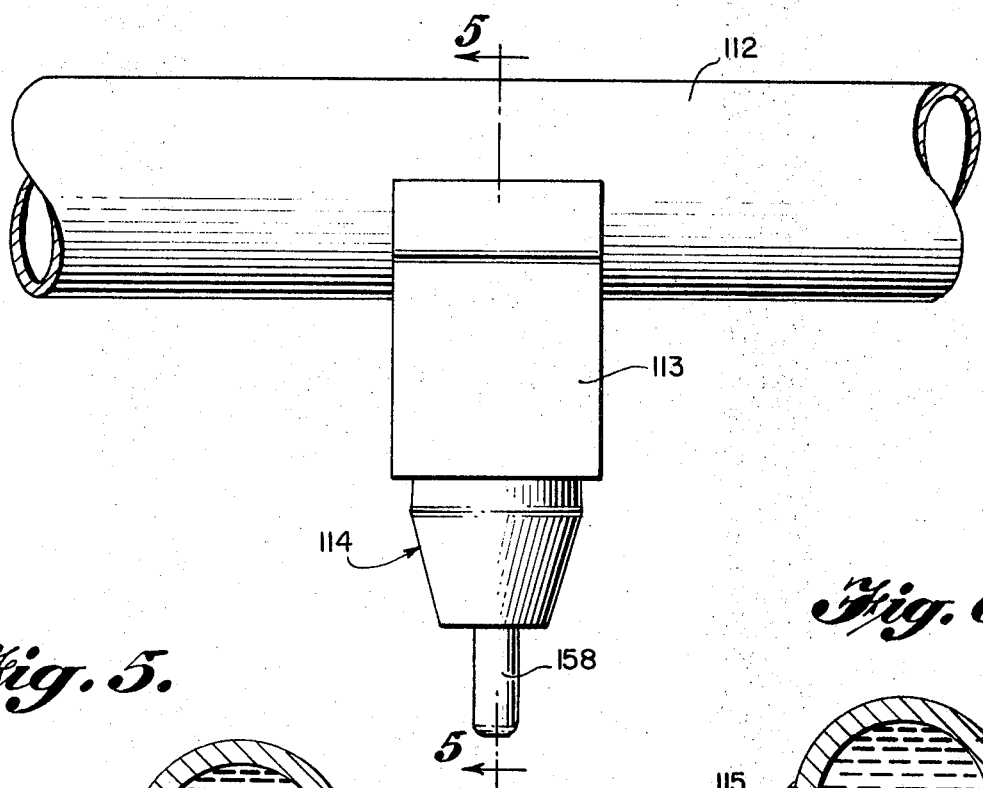
FIG. 4 is an enlarged side elevational view of a portion of a feed line showing a modified watering valve means.

In FIG. 4 a fragmentary portion of an elongated feed line or conduit is indicated at 112 and has, in longitudinally spaced relation therealong, integral housings 113 communicating with the interior of the conduit at an upper opening 115. The housing 113 includes a depending skirt 116 which is internally threaded at 117 and receives therein poultry-actuated watering valve means 114.

The valve means 114 comprises an elongated body portion 124 externally threaded at 125 for removable receipt in threaded aperture 117 of the housing. The body portion forms an upper chamber 130 in communication with the interior of conduit 112 through opening 115. Trapped in chamber 130 between the opening 115 and body 124 is a ball-valve element 132.

Figure 5:
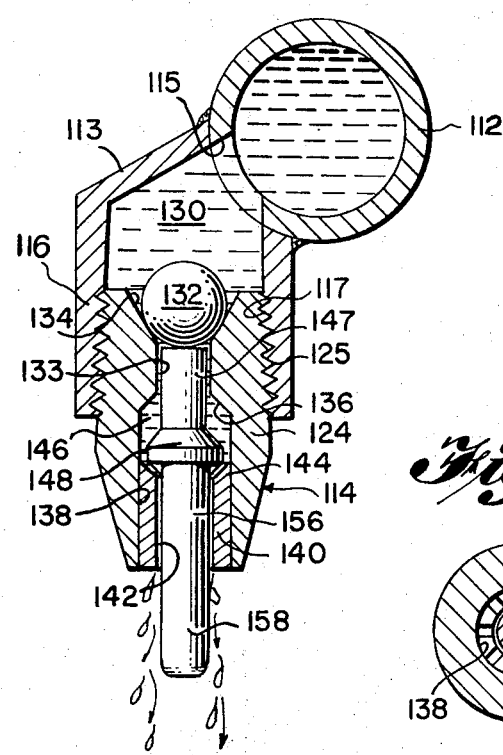
FIG. 5 is a vertical section on the plane of line 5–5 of FIG. 4.

The body 124 has an axial bore 133 terminating at its upper end in a frusto-conical, upwardly diverging valve seat 134 in which the ball-valve element 132 will sealingly seat, as seen in FIG. 5. The bore 133 terminates in a lower, downwardly diverging valve seat 136, continuing in an enlarged bore portion 138. Received in the bore portion 138 is a tubular sleeve or bushing 140 having a through bore portion 142 in axial alignment with the bore portion 133. The upper or inner end of the bushing is a plurality of radially extending, downwardly angled notches 144; see FIG. 7.

The bushing 140 forms in the bore 138 a chamber 146, and extending through the bore portion 133, chamber 144 and through the bore 142 is an actuator rod 156 functioning as does the rod 56 described relative to FIGS. 1—3. The rod 156 includes an upper guide and abutment stem 147 disposed in bore 133 and normally positioned below valve seat 134; see FIG. 5. Integral with stem 156 is an intermediate valve portion 148, normally resting on the upper end of bushing 140 at notches 144; see FIG. 5. The stem 156 depends loosely through bore 142 and terminates in an operator portion 158, which is founded at the lower end.

At normal line pressure, the parts assume the position shown in FIG. 5 and the ball-valve 132 is seated in valve seat 134. Water trapped in chamber 146 will drip past valve portion 148, through notches 144 and out of bore 142 along the actuator rod 156.

Figure 6:
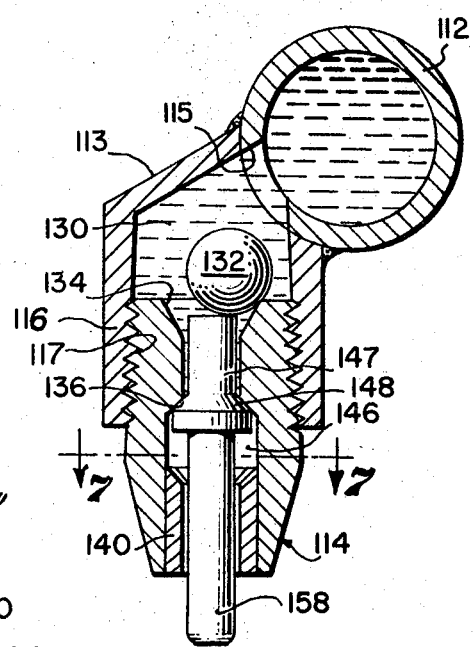
FIG. 6 is a view similar to FIG. 5, showing the position of the parts when a vacuum is applied to the line.

When a vacuum is applied to the system, as explained regarding FIG. 1, the actuator rod 156 will be drawn to the position shown in FIG. 6, and valve portion 148 will seat on valve seat 136. This movement will attract the attention of the poultry. Relief of vacuum and restoration of normal pressure in the line will result in a charge of water accumulating in chamber 146 and water dripping to attract thirsty poultry.

When the poultry peck at the actuator rod (see FIG. 2) the ball 132 will be displaced off seat 134, as in vacuum actuation, and a charge of liquid will be provided in chamber 146.

Figure 7:
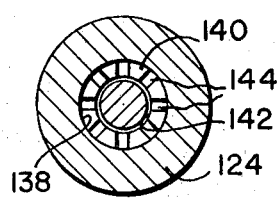
FIG. 7 is a section on line 7–7 of FIG. 6.

The valve and system of FIGS. 5—7 thus function in the same manner as that of FIGS. 1—3; however, this later valve affords simplicity of manufacturing and assembly of the cooperating components.

In FIGS. 4—5, insufficient vacuum is provided to raise ball-valve 132, yet actuator rod remains in the position shown in FIG. 5, water will drip as seen in FIG. 5, without movement of the actuator rod, and the poultry, due to thirst, will instinctively peck at the actuator rod.

Although a vacuum-operated system has been illustrated in this exemplary embodiment, other comparable methods of cycled or mechanical operation of valve assemblies can be used, i.e., alternating pressure vibrations imposed on the water line, etc., magnetic attraction, etc.

It will be obvious to those skilled in the art that various changes may be made without departing from the scope of the invention and the invention is not to be considered limited to what is shown in the drawings and described in the specification.

I claim:
1. A system for automatically watering and training poultry to use the system comprising, in combination:
   a water supply line;
   poultry-operable valve means connected to said line;
      said poultry-operated valve means including operator element means accessible to the poultry,
         said operator element means including means for actuating said valve means and dispensing drops of water; and means for periodically actuating said valve means and causing the operator element means to move whereby poultry are attracted to the operator element movement and are trained to move the operator element by instinctively pecking at the same while being attracted by the periodic movement of the operator element.

2. The system as claimed in claim 1, in which said operator element means comprises a valve portion subject to movement upon pressure variations in said water supply line, said means for periodically operating said valve means comprising a pressure-varying assembly connected to said water supply line.

3. The system as claimed in any of claims 1 and 2 in which the valve means comprises:
at least one valve assembly having an elongated body portion having means for connection to the water supply line, said valve body portion including an intermediate chamber communicating with upper and lower bore portions, said valve chamber including upper and lower valve seats interposed between the respective bore portions;
a valve element in said chamber and including opposed upper and lower valve portions reciprocably retained in said chamber and engageable with the respective upper and lower valve seats for controlling water flow thereby;
said valve element including an actuating rod integral with said lower valve portion and extending through said lower bore and depending from said valve body, said valve portions being subject to pressure variations in said water supply line for reciprocable movement thereby, said lower valve portion normally engaging the lower valve seat and trapping a supply of water in said chamber; and
said upper valve portion being engageable with said upper valve seat, due to pressure variation in said water supply line, and permitting trapped water in said chamber to descend out of said lower bore portion along said actuator rod.

4. A method for training poultry to use an automatic water supply system incorporating poultry-actuated valve assemblies, comprising the steps of:
a. installing a watering system including poultry-actuated valve means having actuating elements accessible to the poultry,
b. periodically actuating the valve means and dispensing water droplets accessible to the poultry whereby poultry are trained to expect to receive the water supply from the valve means and instinctively peck at the valve means; and
c. eliminating periodic actuation of the valve means and permitting the poultry to operate the actuating elements after the poultry have been trained.

5. The method set forth in claim 4 includes the step of actuating said valve means periodically by varying pressure within the watering system.

6. The method set forth in claim 4 in which said valve actuating elements are moved when droplets are dispensed and attracting the poultry's attention to the actuating elements by their physical movement.

7. A valve assembly for use in a poultry watering system comprising:
a water supply line; and
said valve assembly having an elongated body portion:
said body portion including:
an intermediate chamber communicating with upper and lower bore portions, said intermediate chamber including upper and lower valve seats interposed between the respective bore portions, a valve element in said chamber and including upper and lower valve seats interposed between the respective bore portions, a valve element in said chamber and including opposed upper and lower valve portions reciprocably retained in said chamber and engageable with the respective upper and lower valve seats for controlling water flow thereby;
said valve element including an actuating rod integral with said lower valve portion and extending through said lower bore and depending from said valve body;
said valve portions being subject to pressure variations in said valve supply line for reciprocal movement thereby, said lower valve portion normally engaging the lower valve seat and trapping a supply of water in said chamber,
said upper valve portion being engageable with said upper valve seat due to pressure variations in said water supply line and permitting trapped water in said chamber to descent out of said lower bore portions along said actuator rod.

8. A valve assembly for use in a poultry watering system comprising:
a water supply line;
said valve assembly comprising an upper chamber communicating with said water supply line, a body portion including a bore portion having an upper conical valve seat communicating with said chamber, a ball-valve in said upper chamber engageable with said seat for normally preventing fluid flow into said bore portion, said bore portion terminating in a second conical valve seat concluding in an enlarged bore portion;
a sleeve having a bore portion in coaxial alignment with the first-mentioned bore portion and forming a second chamber below said second conical valve seat;
an actuator rod including an upper stem portion reciprocably received in said first mentioned bore portion and an intermediate valve portion trapped in said second chamber and engageable with said second valve seat, said actuator rod including a lower operator portion reciprocably depending through the bore portion of said sleeve for engagement by poultry whereby upward movement of said actuating rod will displace said ball-valve off the upper valve seat and cause the intermediate valve portion of said rod to sealingly engage said second valve seat.

9. The structure as claimed in claim 8 in which said bushing includes at least one groove portion extending radially from and communicating with the bore portion in said sleeve for permitting fluid to drain from said second chamber from beneath said intermediate valve portion.

10. The structure as claimed in any one of claims 8 and 9 in which said valve assembly includes a housing projecting laterally with and communicating with said water supply line, a body portion received in said housing and having an upper portion defining the lower portion of said upper chamber, said body portion including portions defining said valve seats and first mentioned bore portion.